United States Patent
Nagatsu (10) Patent No.: US 10,266,141 B2
(45) Date of Patent: Apr. 23, 2019

(54) SEATBELT AND AIRBAG OCCUPANT PROTECTION APPARATUS

(71) Applicant: FUJI JUKOGYO KABUSHIKI KAISHA, Tokyo (JP)

(72) Inventor: Hisayuki Nagatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1 day.

(21) Appl. No.: 15/439,116

(22) Filed: Feb. 22, 2017

(65) Prior Publication Data

US 2017/0282833 A1 Oct. 5, 2017

(30) Foreign Application Priority Data

Mar. 31, 2016 (JP) ................................. 2016-072208

(51) Int. Cl.
| | |
|---|---|
| *B60R 21/18* | (2006.01) |
| *B60R 21/207* | (2006.01) |
| *B60R 21/20* | (2011.01) |
| *B60R 22/26* | (2006.01) |
| B60R 21/00 | (2006.01) |
| B60R 21/01 | (2006.01) |
| B60R 22/18 | (2006.01) |

(52) U.S. Cl.
CPC ............. *B60R 21/18* (2013.01); *B60R 21/20* (2013.01); *B60R 21/207* (2013.01); *B60R 22/26* (2013.01); *B60R 2021/0048* (2013.01); *B60R 2021/01034* (2013.01); *B60R 2021/01211* (2013.01); *B60R 2021/01279* (2013.01); *B60R 2022/1818* (2013.01)

(58) Field of Classification Search
CPC ....................................................... B60R 21/18
See application file for complete search history.

(56) References Cited

U.S. PATENT DOCUMENTS

| | | | | |
|---|---|---|---|---|
| 5,851,055 | A * | 12/1998 | Lewis ..................... | B60R 21/18 280/733 |
| 6,082,763 | A * | 7/2000 | Kokeguchi ............. | B60R 21/18 280/733 |
| 6,276,715 | B1 * | 8/2001 | Takeuchi ................ | B60R 21/18 280/728.1 |

(Continued)

FOREIGN PATENT DOCUMENTS

| | | |
|---|---|---|
| JP | 2017-039447 A | 2/1917 |
| JP | 11-170948 | 6/1999 |
| JP | 2010-036795 | 2/2010 |

OTHER PUBLICATIONS

Japanese Office Action dated Aug. 8, 2017, in Patent Application No. 2016-072208 (6 pages in Japanese with English Translation).

*Primary Examiner* — Barry Gooden, Jr.

(74) *Attorney, Agent, or Firm* — Smith, Gambrell & Russell LLP (57) ABSTRACT

An occupant protection apparatus includes a seatbelt device and airbag device. The seatbelt device is capable of restraining an occupant to be seated on a seat in a vehicle. The airbag device includes an airbag casing to be disposed on or above a shoulder of the occupant. The seatbelt device includes a belt extendable through an insertion hole of the airbag casing. A fastening member is disposed in the insertion hole. The fastening member is configured to fasten the belt to the airbag casing when the belt is pulled out in a crash of the vehicle.

15 Claims, 6 Drawing Sheets

(56) References Cited

U.S. PATENT DOCUMENTS

| | | | | |
|---|---|---|---|---|
| 6,325,412 B1* | 12/2001 | Pan | ............... | B60R 21/18 |
| | | | | 180/268 |
| 6,336,656 B1* | 1/2002 | Romeo | ............... | B60R 21/18 |
| | | | | 280/733 |
| 6,382,666 B1* | 5/2002 | Devonport | ............... | B60R 21/18 |
| | | | | 280/730.1 |
| 2002/0041088 A1* | 4/2002 | Grace | ............... | B60R 21/18 |
| | | | | 280/733 |
| 2002/0074784 A1* | 6/2002 | Mishima | ............... | B60R 21/18 |
| | | | | 280/733 |
| 2003/0001378 A1* | 1/2003 | Kim | ............... | A41D 13/018 |
| | | | | 280/801.1 |
| 2006/0237954 A1* | 10/2006 | Kokeguchi | ............... | B60R 21/18 |
| | | | | 280/733 |
| 2007/0080528 A1* | 4/2007 | Itoga | ............... | B60R 21/18 |
| | | | | 280/733 |
| 2013/0249200 A1* | 9/2013 | Higuchi | ............... | B60R 21/18 |
| | | | | 280/733 |
| 2016/0075299 A1* | 3/2016 | Wang | ............... | B60R 21/18 |
| | | | | 280/728.2 |
| 2017/0050601 A1 | 2/2017 | Kobata | | |
| 2017/0282832 A1* | 10/2017 | Kondo | ............... | B60R 1/00 |
| 2017/0282833 A1* | 10/2017 | Nagatsu | ............... | B60R 21/207 |
| 2018/0297547 A1* | 10/2018 | Lee | ............... | B60R 21/18 |

* cited by examiner

SEATBELT AND AIRBAG OCCUPANT PROTECTION APPARATUS

CROSS REFERENCES TO RELATED APPLICATIONS

The present application claims priority from Japanese Patent Application No. 2016-072208 filed in the Japan Patent Office on Mar. 31, 2016, the entire contents of which are hereby incorporated by reference.

BACKGROUND

1. Technical Field

The present invention relates to an occupant protection apparatus disposed at a seat of a vehicle such as an automobile, and particularly to an occupant protection apparatus that includes a combination of a seatbelt device and an airbag device to protect an occupant in an oblique crash or a small overlap crash.

2. Related Art

An airbag device installed in a steering wheel or an airbag device installed in a belt of a seatbelt device is known as a structure that protects a driver seated on a driver seat in a vehicle crash. An airbag device installed in a steering wheel protects a head or other parts of a driver moving to the vehicle front in a crash. An airbag device installed in a belt prevents the chest or other parts of an occupant from being pressed. These airbag devices are combined and appropriately inflated and deployed to effectively protect an occupant (see, for example, Japanese Unexamined Patent Application Publication No. 11-170948).

Vehicles equipped with a curtain airbag that protects a head or other portions of an occupant in, for example, a vehicle crash have been increasing. A typical curtain airbag, stored in a space extending from the inside of a front pillar trim to the inside of a roof trim, is deployed along a side window glass in, for example, a vehicle crash to protect the occupant's head (see, for example, JP-A No. 2010-36795).

A conceivable, typical measure that an airbag device takes against an oblique crash or a small overlap crash is to increase the size of an airbag. The size increase of airbag fabric, however, involves a need of an enhancement of an inflator output, which results in size increase of an inflator device and reduction in capacity of a vehicle compartment. The size increase of the airbag fabric and the size increase of the inflator device result in an increase in cost.

On the driver seat side, in particular, a steering wheel, disposed in front of the driver and from which a front airbag is inflated and deployed, has a small storage space, which hinders size increase of the front airbag. Besides the steering wheel, components such as a display or operation buttons are disposed on the instrument panel on the driver seat side, so that they limit the space in which the airbag is disposed and inflated and deployed.

In an event of an oblique crash or a small overlap crash on the passenger seat side, the driver is moved obliquely forward toward the vehicle center by the impact resulting from the crash. The head of the driver is protected by the front airbag inflated and deployed from the steering wheel. As described above, however, the front airbag is small and the driver moves obliquely forward. Thus, the head of the driver may rotate while being restrained by the front airbag and may be more likely to be severely injured. Besides, the neck of the driver may have a whiplash injury.

SUMMARY OF THE INVENTION

It is desirable to provide an occupant protection apparatus that includes a combination of a seatbelt device and an airbag device and that protects a head of an occupant by restraining at least one side of the back of the head of the occupant using an airbag.

An occupant protection apparatus according to an aspect of the present invention includes a seatbelt device capable of restraining an occupant to be seated on a seat disposed in a vehicle, and an airbag device that includes an airbag casing to be disposed on or above a shoulder of the occupant. The seatbelt device includes a belt extendable through an insertion hole of the airbag casing. A fastening member is disposed in the insertion hole. The fastening member is configured to fasten the belt to the airbag casing when the belt is pulled out in a crash of the vehicle.

The airbag device may include an airbag encased in the airbag casing. The airbag being may be configured to be inflated and deployed so as to restrain at least one side of a back of a head of the occupant.

The occupant protection apparatus may further include a fastening pin capable of fastening the airbag casing to the seat. The fastening pin may be broken when the fastening member fastens the belt to the airbag casing in a crash.

The airbag casing may be movable together with the belt while being fastened by the fastening member to the belt.

The belt may be pulled out from an upper portion of a seat back of the seat. The upper portion may be located closer to an inner side in a vehicle width direction of the vehicle.

BRIEF DESCRIPTION OF THE DRAWINGS

FIGS. 1A and 1B illustrate a vehicle seat on which an occupant protection apparatus according to an implementation of the present invention is disposed, where

FIGS. 2A, 2B, and 2C illustrate an occupant protection apparatus according to an implementation of the present invention, where

FIGS. 3A and 3B illustrate an occupant protection apparatus according to an implementation of the present invention, where

FIGS. 4A and 4B illustrate an occupant protection apparatus according to an implementation of the present invention, where

FIGS. 5A and 5B illustrate an occupant protection apparatus according to an implementation of the present invention where FIGS. 6A and 6B illustrate an occupant protection apparatus according to an implementation of the present invention where

DETAILED DESCRIPTION

Referring now to the drawings, an occupant protection apparatus according to an implementation of the present invention is described in detail below. The implementation describes a case where a driver's seat is provided on the right side in a vehicle compartment, in a traffic system whereby vehicles move on the left side of a road. In the description of the implementation, the same components are denoted with the same reference symbols in principle and are not repeatedly described.

Figure 1A:
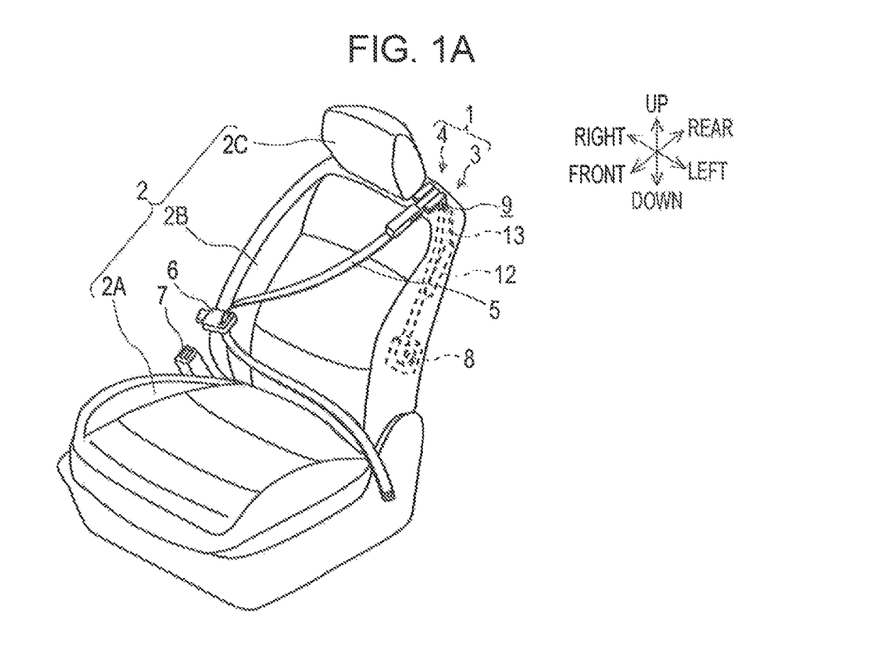
FIG. 1A is a perspective view of the vehicle seat and FIG. 1B is a side view of the vehicle seat.
Figure 1B:
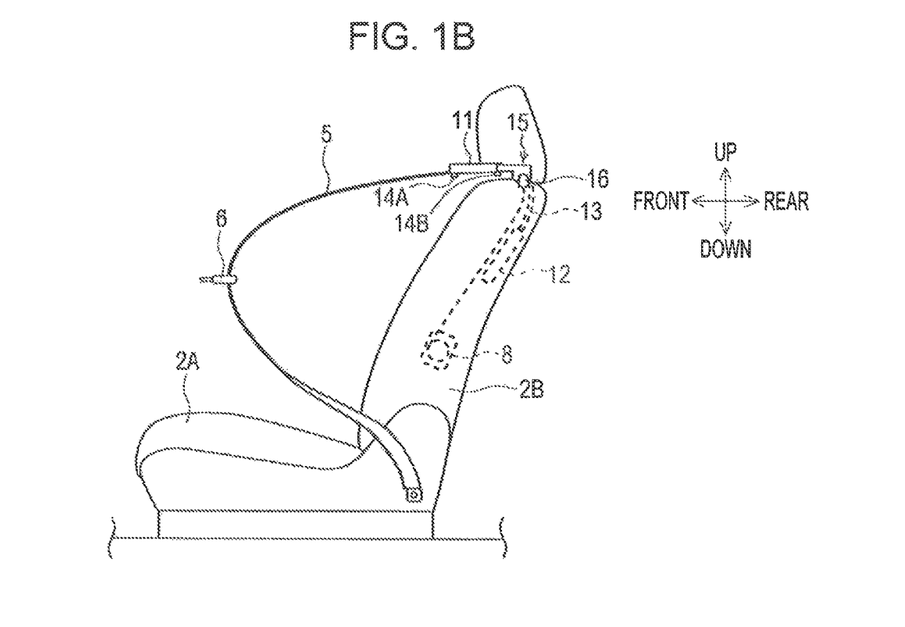

FIG. 1A is a perspective view of a vehicle seat 2 on which an occupant protection apparatus 1 according to an implementation is disposed and FIG. 1B is a side view of the vehicle seat 2 illustrated in FIG. 1A.

As illustrated in FIG. 1A, the occupant protection apparatus 1 according to this implementation mainly includes a seatbelt device 3, disposed on the vehicle seat 2 (also referred to as the driver seat 2), and an airbag device 4, disposed on the driver seat 2. The case described below is the case where the occupant protection apparatus 1 is disposed on the driver seat 2. However, the present invention is not limited to this case and the occupant protection apparatus 1 may be disposed on a passenger seat or a rear seat.

The driver seat 2 includes a seat cushion 2A, on which an occupant P is seated, a seat back 2B, extending upward from the rear of the seat cushion 2A to support the back of the occupant P, and a head rest 2C, disposed on an upper end portion of the seat back 2B. The seatbelt device 3 is, for example, a three-point seatbelt device.

The seatbelt device 3 mainly includes a belt 5, a tongue plate 6, a buckle 7, and a retractor 8. One end of the belt 5 is attached to the retractor 8 and the other end of the belt 5 is fixed to the seat frame (not illustrated) of the seat cushion 2A or the vehicle body. The retractor 8 is disposed, for example, inside the seat back 2B and fixed to the seat frame (not illustrated) of the seat back 2B.

The tongue plate 6, movable in the longitudinal direction of the belt 5, is attached to the belt 5. When an occupant P (see FIG. 3A) pulls the tongue plate 6, the belt 5 is drawn out from the retractor 8. When, on the other hand, the occupant P lets go of the tongue plate 6, the belt 5 is rewound by the retractor 8. An opening 9 is formed in an upper end surface of the seat back 2B on one side of the head rest 2C closer to the center of a vehicle 30 (see FIG. 3A). The belt 5 and a tube 13 of the airbag device 4 extend through the opening 9. The other end of the belt 5 is fixed to a component such as the seat frame (not illustrated) on the side closer to the center of the vehicle 30 using an anchorage (not illustrated).

The buckle 7 is fixed to the seat frame (not illustrated) of the seat cushion 2A by the window of the vehicle 30 or to the vehicle 30. When the occupant P is wearing the seatbelt device 3, the tongue plate 6 is buckled on the buckle 7. At this time, a portion of the belt 5 above the tongue plate 6 functions as a shoulder belt and extends obliquely over the front surface of the seat back 2B to restrain the chest or other parts of the occupant P. A portion of the belt 5 below the tongue plate 6, on the other hand, functions as a lap belt and extends across the front surface of the seat back 2B to restrain the waist or other parts of the occupant P.

The seatbelt device 3 includes, for example, a pretensioner mechanism equipped with a load limiter. A controller (not illustrated) of the vehicle 30 detects the tensile force of the belt 5 in an oblique crash or a small overlap crash. When the controller detects a tensile force of a predetermined value or higher, the controller instantaneously rewinds the slack of the belt 5 to restrain the occupant P in the driver seat 2. After the controller detects the tensile force of the belt 5 that is a predetermined value or higher, the controller loosens the restraint of the belt 5 to reduce the load imposed on the occupant P. Thus, the belt 5 is gradually drawn out from the retractor 8 again.

Although the detail is described below, when the belt 5 is loosened and the occupant P moves forward in response to the actuation of the load limiting mechanism, an airbag 10 (see FIG. 5A) of the airbag device 4 moves together with the belt 5 so as to follow the movement of the occupant P. When the airbag 10 keeps restraining at least one side of the back part of the head of the occupant P, the head of the occupant P is prevented from rotating, whereby the head is prevented from being severely injured.

As illustrated in FIG. 1B, the airbag device 4 mainly includes the airbag 10 (see FIG. 5A), an airbag casing 11, which encases the airbag 10, an inflator 12, which feeds gas to the airbag 10, and the tube 13, which connects the airbag 10 and the inflator 12 to each other.

The airbag 10 is a cloth bag that is inflated and deployed in response to an injection of high pressure gas. The airbag 10 is encased in the airbag casing 11 while being folded in, for example, an accordion manner. The airbag casing 11 is made of a material such as a metal and has insertion holes 14A and 14B at the bottom surface, into which the belt 5 is inserted. The inflator 12 and the tube 13 are disposed inside the seat back 2B. The inflator 12 is fixed to the seat frame (not illustrated) of the seat back 2B.

Although the detail is described below, the airbag casing 11, which encases the airbag 10, is detached from an attachment mechanism 15 in a crash of the vehicle 30 and moves together with the belt 5 so as to follow the movement of the occupant P. To allow the inflated and deployed airbag 10 and other components to move so as to follow the movement of the occupant P, the tube 13 is provided with an extra length allowing for the movement and housed inside the seat back 2B.

As illustrated, part of the seat frame of the seat back 2B protrudes to the upper side of the vehicle 30 from the upper end surface of the seat back 2B to function as a fixing pole 16 of the airbag casing 11. The fixing pole 16 extends in the vehicle width direction of the vehicle 30 on the upper end surface of the seat back 2B and the attachment mechanism 15 is rotatably attached to the fixing pole 16. The airbag casing 11 is fixed to the attachment mechanism 15 using multiple resin pins 17 (see FIG. 2A) and rendered rotatable with respect to the fixing pole 16.

When, for example, the seatbelt device 3 is not worn, the airbag casing 11 is placed at an upper portion of the seat back 2B, so that the occupant P can smoothly board or alight from the vehicle 30 without becoming caught on the airbag casing 11. When, on the other hand, the occupant P wears the seatbelt device 3, the airbag casing 11 is placed on the upper surface of the left shoulder of the occupant P together with the belt 5. Since the airbag casing 11 is rotatable with respect to the fixing pole 16, the position of the airbag casing 11 is adjustable in accordance with the physique of the occupant P.

Figure 2A:
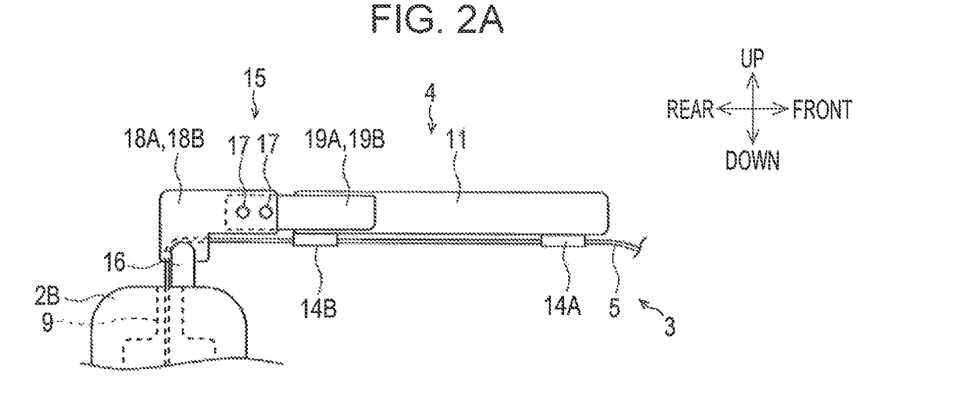
FIG. 2A is a side view of the apparatus.
Figure 2B:
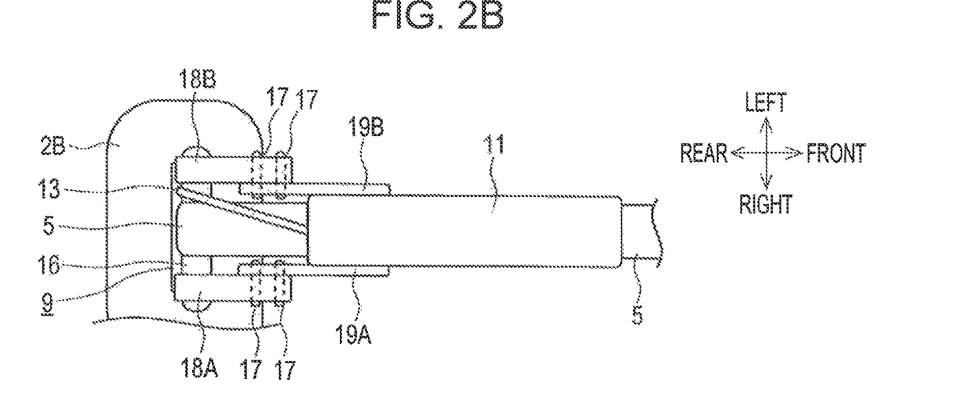
FIG. 2B is a top view of the apparatus.
Figure 2C:
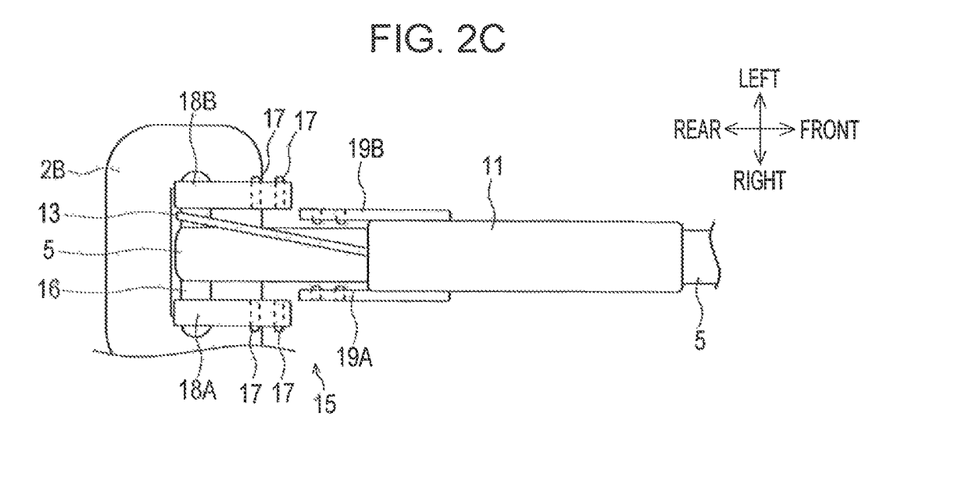
FIG. 2C is another top view of the apparatus.

FIG. 2A is a side view of the airbag device 4 included in the occupant protection apparatus 1 according to this implementation. FIG. 2B is a top view of the airbag casing 11 of the airbag device 4 illustrated in FIG. 2A while being fixed to the fixing pole 16. FIG. 2C is a top view of the airbag casing 11 of the airbag device 4 illustrated in FIG. 2A while being detached from the attachment mechanism 15. Here, FIG. 2A omits of the head rest 2C for convenience of illustration.

As illustrated in FIG. 2A, the attachment mechanism 15 mainly includes a pair of rotation members 18A and 18B, disposed at the fixing pole 16, a pair of support plates 19A and 19B, fixed to the airbag casing 11, and multiple resin pins 17, which fix the rotation members 18A and 18B and the support plates 19A and 19B to one another.

The rotation members 18A and 18B are made of a material such as a resin or a metal and have, for example, an approximately L shape. The rotation members 18A and 18B are rotatably attached to the cylindrical fixing pole 16 and allow the airbag casing 11 to move to the upper and lower sides of the vehicle 30 in accordance with the movements of the occupant P boarding and alighting from the vehicle 30.

As illustrated in FIGS. 2B and 2C, the rotation members 18A and 18B are spaced apart from each other in the vehicle width direction of the vehicle 30 to hold the airbag casing 11 between themselves. The belt 5 of the seatbelt device 3 and the tube 13 of the airbag device 4 are disposed in the space between the rotation members 18A and 18B. As illustrated, the belt 5 extends over the upper surface of the fixing pole 16 and extends through the insertion holes 14A and 14B of the airbag casing 11.

As illustrated in FIG. 2B, the support plates 19A and 19B are fixed to the airbag casing 11 on both side surfaces in the vehicle width direction of the vehicle 30. The support plates 19A and 19B extend in the front-rear direction of the vehicle 30 and are fixed to the rotation members 18A and 18B using the resin pins 17 while being interposed between the rotation members 18A and 18B. Each of the rotation members 18A and 18B and the support plates 19A and 19B is fixed using two resin pins 17. This structure allows the airbag casing 11 to rotate with respect to the fixing pole 16 using the rotation members 18A and 18B.

The airbag 10 (see FIG. 5A) encased in the airbag casing 11 is connected to the inflator 12 with the tube 13 interposed therebetween. When the vehicle 30 has an oblique crash or a small overlap crash, high pressure gas is injected into the airbag 10 from the inflator 12 in the airbag device 4. The head of the occupant P is thus protected as a result of the airbag 10 being inflated and deployed so as to restrain at least one side of the back part of the head of the occupant P. Here, the airbag casing 11 is constantly located on the upper surface of the belt 5, so that the airbag 10 can be inflated and deployed without being blocked by the belt 5.

As illustrated in FIG. 2C, the airbag casing 11 is detached from the attachment mechanism 15 when the resin pins 17 that connect the rotation members 18A and 18B and the support plates 19A and 19B to one another are broken.

Here, a tongue equipped with a lock mechanism (not illustrated) is disposed in the insertion hole 14A. The tongue equipped with a lock mechanism is actuated when the belt 5 is abruptly pulled out in a crash of the vehicle 30 to clamp the belt 5. Once the belt 5 is clamped by the tongue equipped with a lock mechanism, the belt 5 is kept in a clamped state.

In the event of a crash of the vehicle 30, an extraordinarily high load is imposed on the belt 5. When the belt 5 is clamped by the tongue equipped with a lock mechanism, the load is imposed on the four resin pins 17 and the resin pins 17 are broken. The airbag casing 11 is thus detached from the attachment mechanism 15 and moves together with the belt 5 while being located at the clamped position. As illustrated, the tube 13 is provided with an extra length allowing for the movement of the airbag casing 11. Thus, the tube 13 is also drawn out from the inside of the seat back 2B, so that the detached airbag 10 is inflated and deployed.

Figure 3A:
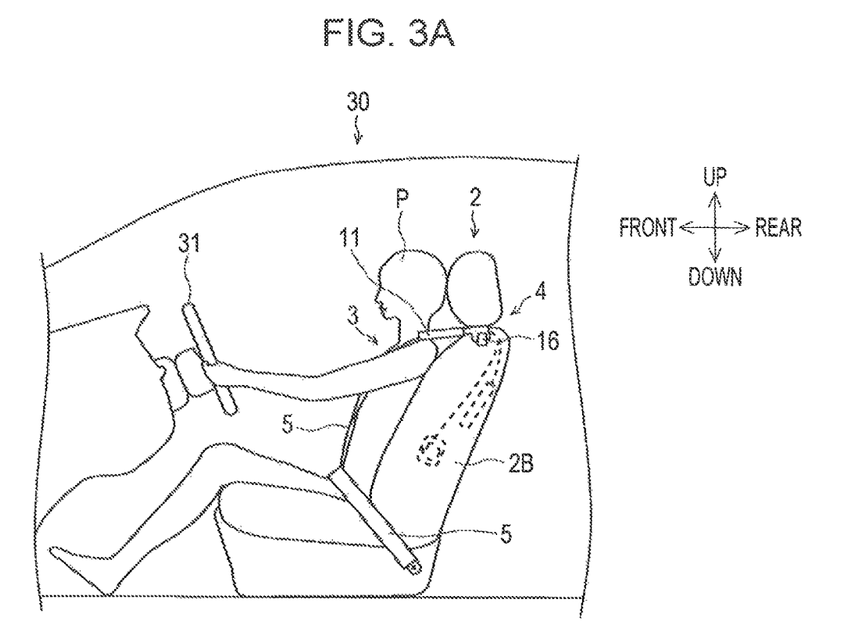
FIG. 3A is a side view of the apparatus and FIG. 3B is a top view of the apparatus.
Figure 4A:
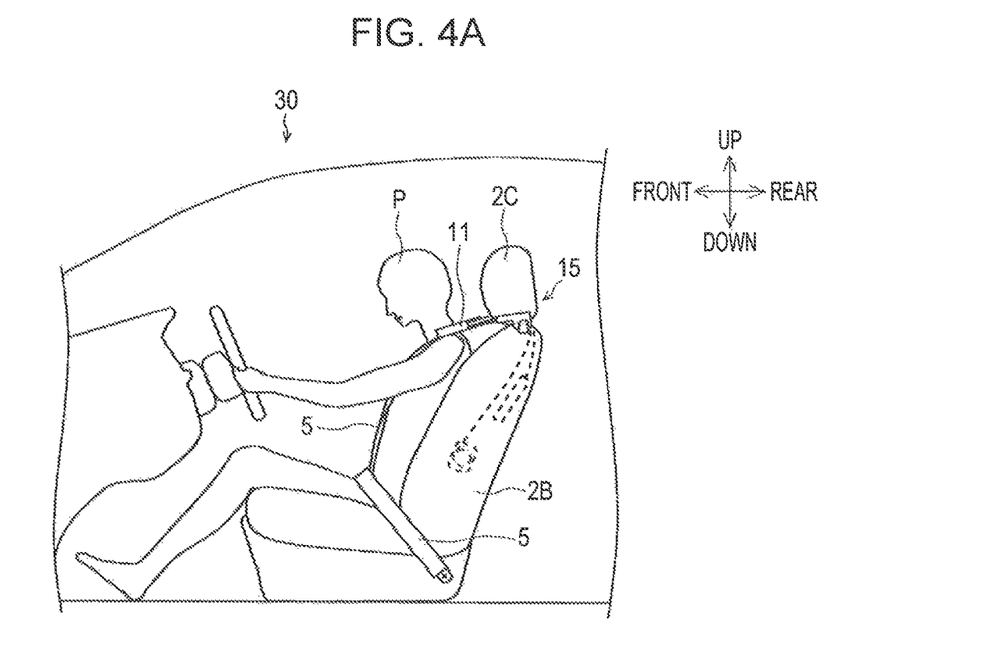
FIG. 4A is a side view of the apparatus and FIG. 4B is a top view of the apparatus.
Figure 4B:
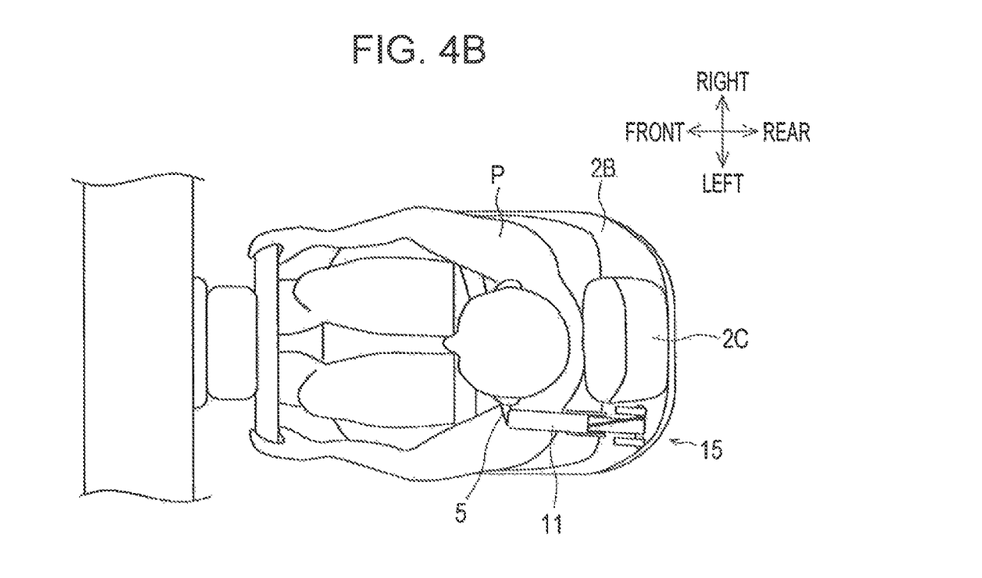
Figure 5A:
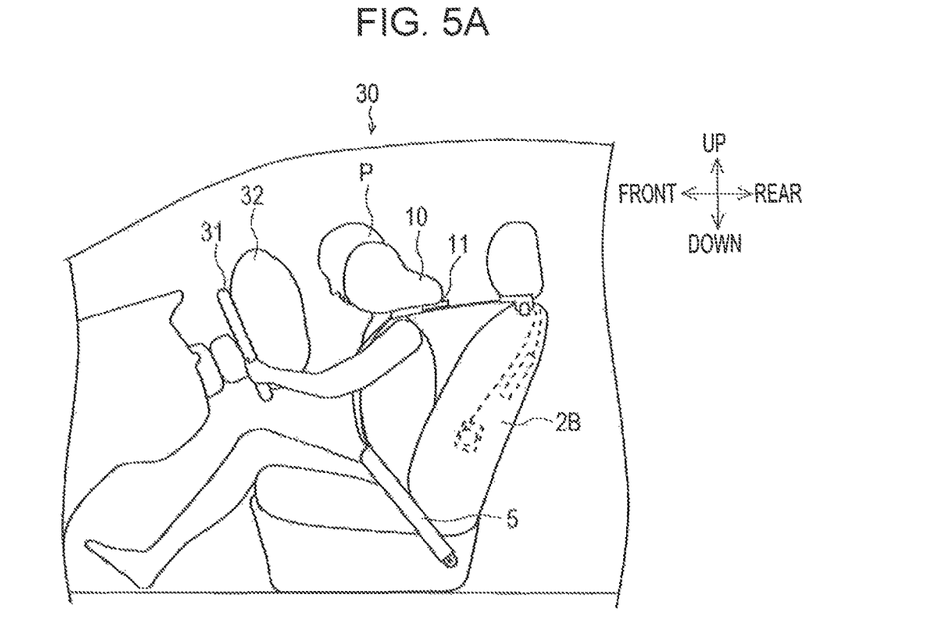
FIG. 5A is a side view of the apparatus and FIG. 5B is a top view of the apparatus.
Figure 5B:
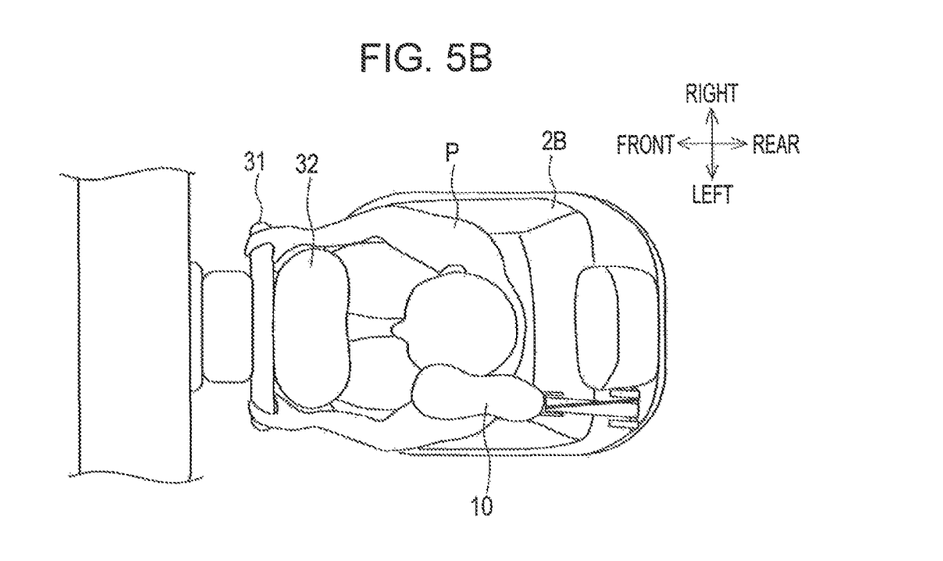
Figure 6A:
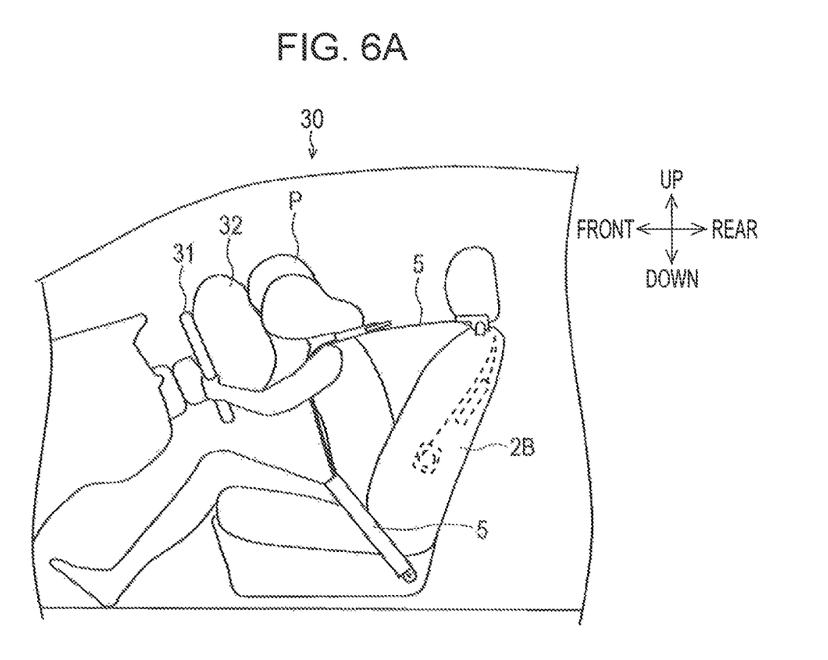
FIG. 6A is a side view of the apparatus and FIG. 6B is a top view of the apparatus.
Figure 6B:
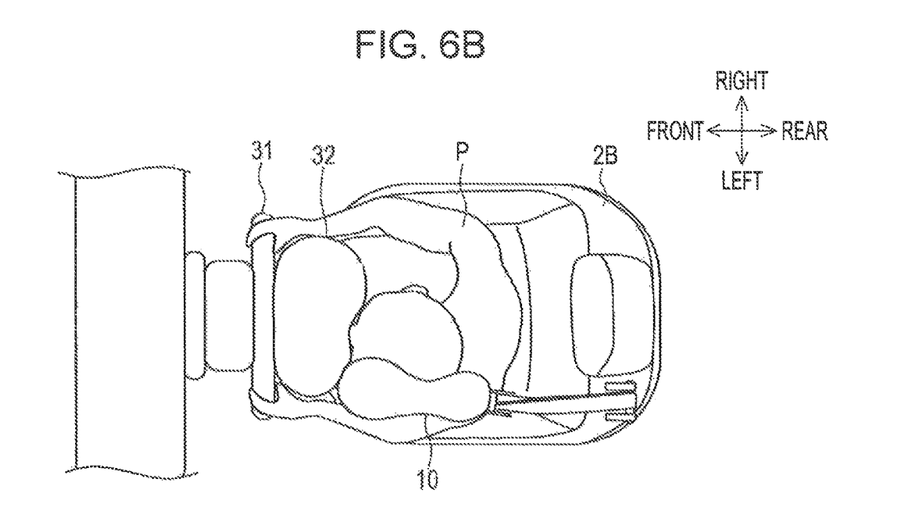

Referring now to FIG. 3A to FIG. 6B, operations of the occupant protection apparatus 1 from the normal driving state to the operation in an oblique crash or a small overlap crash are described. FIGS. 3A and 3B illustrate the occupant protection apparatus 1 in the normal driving state, where FIG. 3A is a side view of the apparatus 1 and FIG. 3B is a top view of the apparatus 1. FIGS. 4A and 4B illustrate the occupant protection apparatus 1 immediately after the oblique crash or the small overlap crash, where FIG. 4A is a side view of the apparatus 1 and FIG. 4B is a top view of the apparatus 1. FIGS. 5A and 5B illustrate the occupant protection apparatus 1 in the state where the load limiting mechanism of the seatbelt device 3 is actuated after the oblique crash or the small overlap crash, where FIG. 5A is a side view of the apparatus 1 and FIG. 5B is a top view of the apparatus 1. FIGS. 6A and 6B illustrate the occupant protection apparatus 1 in the state of protecting the occupant using multiple airbags after the oblique crash or the small overlap crash, where FIG. 6A is a side view of the apparatus 1 and FIG. 6B is a top view of the apparatus 1.

FIG. 3A illustrates the state where the occupant P is driving the vehicle 30 while being seated on the driver seat 2 and wearing the seatbelt device 3. The occupant P is deeply seated in the driver seat 2, is fixed at a driving position suitable for the physique of the occupant P, and wears the seatbelt device 3. The occupant P operates the vehicle 30 while having his/her back in contact with the seat back 2B and holding a steering wheel 31 with both hands. The chest and the waist of the occupant P are restrained by the belt 5.

As described above, the airbag casing 11 of the airbag device 4 is disposed on the upper end surface of the seat back 2B at a portion located closer to the center of the vehicle 30. The belt 5 extends through the insertion holes 14A and 14B (see FIG. 2A) in the bottom surface of the airbag casing 11. In the normal driving state, the airbag casing 11 is fixed to the fixing pole 16 and the belt 5 is slidable with respect to the airbag casing 11 in accordance with the physical movement of the occupant P.

Figure 3B:
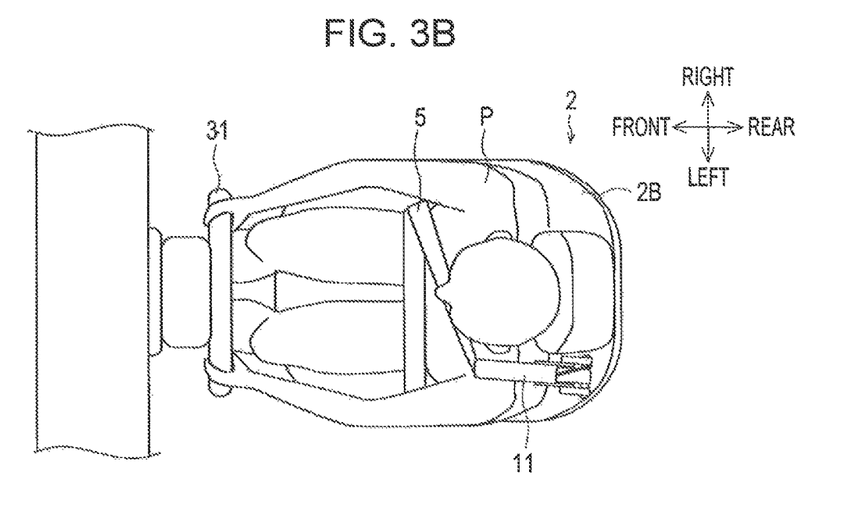

As illustrated in FIG. 3B, the airbag casing 11 is disposed so as to extend from the upper end surface of the seat back 2B to the upper surface of the left shoulder of the occupant P. Although depending on the physique of the occupant P, the end of the airbag casing 11 on the front side of the vehicle 30 is located, for example, beside an ear of the occupant P. The airbag device 4 is provided to prevent the head of the occupant P from rotating and the airbag 10 is disposed so as to be inflated and deployed on at least one side of the back part of the head of the occupant P.

FIG. 4A illustrates the state immediately after an oblique crash or a small overlap crash occurs in front of the passenger seat (not illustrated) of the vehicle 30. In an initial movement of the occupant P immediately after the oblique crash or the small overlap crash, the occupant P seated in the driver seat 2 moves toward the front of the vehicle 30 due to sudden deceleration of the vehicle 30. In response to this movement of the occupant P, the tensile force imposed on the belt 5 is detected. The pretension mechanism of the seatbelt device 3 is then actuated to prevent the occupant P from forcibly colliding against the steering wheel 31 or the windshield (not illustrated). The pretension mechanism of the seatbelt device 3 instantaneously rewinds the slack of the belt 5 to restrain the occupant P in the driver seat 2.

At this time, immediately after the oblique crash or the small overlap crash, the belt 5 is abruptly pulled toward the front of the vehicle 30 in connection with the movement of the occupant P. As described above, in connection with this movement of the belt 5, the tongue equipped with a lock mechanism (not illustrated) disposed in the insertion hole 14A of the airbag casing 11 is actuated, so that the belt 5 is clamped by the airbag casing 11. An impact resulting from the oblique crash or the small overlap crash imposes an extraordinarily high load on the belt 5. This load is also imposed on joints between the rotation members 18A and 18B (see FIG. 2A) and the support plates 19A and 19B (see FIG. 2A). Thus, the resin pins 17 (see FIG. 2A), having a strength unbearable to this load, are broken and the airbag casing 11 is thus detached from the attachment mechanism 15.

As illustrated in FIG. 4B, the head of the occupant P is not directly restrained by the belt 5. Thus, the head of the occupant P moves slightly forward from the head rest 2C. As described above, immediately after the oblique crash or the small overlap crash, the belt 5 is clamped by the airbag casing 11 at a portion located near the head of the occupant P. Thus, the airbag casing 11 moves together with the belt 5 so as to follow the forward movement of the occupant P while substantially keeping the positional relationship between itself and the head of the occupant P unchanged from that in the normal driving operation, illustrated in FIG. 3A. Specifically, the airbag casing 11 is detached from the attachment mechanism 15 so as to be located at such a position at which the airbag 10 can keep restraining at least one side of the back part of the head of the occupant P.

FIG. 5A illustrates the state where the load limiting mechanism of the seatbelt device 3 is actuated and the airbag 10 is inflated and deployed after the oblique crash or the small overlap crash. As described above, immediately after the oblique crash or the small overlap crash, the belt 5 restrains the occupant P on the seat back 2B of the driver seat 2 such that the back of the occupant P is in contact with the seat back 2B. Thereafter, the load limiting mechanism of the seatbelt device 3 is actuated when the tensile force of the belt 5 reaches or exceeds a predetermined value to prevent the occupant P from being injured as a result of receiving an excessive pressure on the chest or other parts of the occupant P from the restraint of the belt 5. The belt 5 is then gradually pulled out from the retractor 8 again to allow the upper part of the occupant P to start moving toward the front of the vehicle 30.

After the oblique crash or the small overlap crash, the airbag device 4 on the driver seat 2 and an airbag device disposed in another portion of the vehicle 30 are also actuated in response to detection of the oblique crash or the small overlap crash. Around the driver seat 2, a front airbag 32 disposed in the steering wheel 31 and a curtain airbag (not illustrated) disposed by the window of the vehicle 30 are inflated and deployed. The airbag 10 of the airbag device 4 is also inflated and deployed before the head of the occupant P collides against the front airbag 32, so that the airbag 10 restrains one side of the back part of the head of the occupant P. As in the case of other airbag devices, the airbag 10 may start being inflated and deployed in response to detection of the oblique crash or the small overlap crash.

As illustrated in FIG. 5B, the airbag casing 11 is detached from the attachment mechanism 15 disposed on the upper end surface of the seat back 2B. When clamping the belt 5, the airbag casing 11 moves toward the front of the vehicle 30 together with the belt 5. The airbag 10 in the airbag casing 11 and the inflator 12 are connected to each other with the tube 13 interposed therebetween. Thus, high pressure gas is injected into the airbag 10 from the inflator 12 and the airbag 10 is inflated and deployed so as to restrain at least one side of the back part of the head of the occupant P. Although not illustrated, a strap that restricts the movement of the airbag 10 may be provided so that the airbag 10 securely restrains one side of the back part of the head of the occupant P.

FIG. 6A illustrates the state where the head of the occupant P collides against the front airbag 32 but the airbag 10 prevents the head of the occupant P from rotating. When an oblique crash or a small overlap crash occurs in front of the passenger seat, the occupant P in the driver seat 2 moves obliquely toward the front of the vehicle 30, toward the center of the vehicle 30.

As illustrated in FIG. 6B, the size of the front airbag 32 inflated and deployed from the steering wheel 31, on the other hand, is limited to such a size as to be receivable in the steering wheel 31. Thus, the head of the occupant P is more likely to collide against a portion of the front airbag 32 deviating from the center of the front airbag 32 toward the center of the vehicle 30. The upper part of the occupant P keeps moving obliquely toward the front of the vehicle 30 while the head of the occupant P is restrained by the front airbag 32, so that the head of the occupant P is more likely to rotate clockwise around the restrained portion of the head.

In this state, the left side of the back of the head of the occupant P is restrained by the airbag 10, as illustrated. The head of the occupant P is thus prevented from rotating clockwise around the restrained portion. Since the airbag casing 11 clamps the belt 5, the airbag 10 can securely support the head of the occupant P. Specifically, the front airbag 32 and the airbag 10 receive and support the head of the occupant P facing approximately forward, so that the neck of the occupant P is prevented from being twisted and the head of the occupant P is prevented from being severely injured.

As described above, in the occupant protection apparatus according to the implementation of the present invention, the airbag casing of the airbag device is disposed on or above a shoulder of an occupant and the belt of the seatbelt device extends through the insertion holes in the airbag casing. In the event of a vehicle crash, the airbag casing is fixed in an intended position near the occupant's head as a result of a fastening member, disposed in one of the insertion holes, fastening the belt. This structure allows the airbag to be inflated and deployed near the occupant's head, so that the occupant's head can be appropriately protected.

In the occupant protection apparatus according to the implementation of the present invention, the airbag encased in the airbag casing is inflated and deployed so as to restrain at least one side of the back part of an occupant's head, so that the occupant's head is prevented from rotating in an oblique crash or a small overlap crash and the occupant's head is prevented from being severely injured.

In the occupant protection apparatus according to the implementation of the present invention, the airbag casing is fixed to an upper portion of the seat using fastening pins. The airbag casing is detached from the upper portion of the seat when the fastening pins are broken by the impact resulting from a vehicle crash, so that the airbag casing can move so as to follow the movement of the occupant's head.

In the occupant protection apparatus according to the implementation of the present invention, the airbag casing is detached from an upper portion of the seat and moves together with the belt of the seatbelt device so as to follow the movement of the occupant's head. This structure allows the airbag to be inflated and deployed near the occupant's head, so that the occupant's head can be appropriately protected.

In the occupant protection apparatus according to the implementation of the present invention, the airbag casing is disposed on the upper end surface of the seat back at a portion located closer to the vehicle center. This structure can appropriately protect the occupant's head moving toward the vehicle center in an oblique crash or a small overlap crash.

This implementation describes the case where the seatbelt device 3 of the occupant protection apparatus 1 is installed in the driver seat 2 and the belt 5 is disposed so as to extend from a portion near the center of the vehicle 30 closer to the window side of the vehicle 30. However, this is not the only possible case. For example, the belt 5 of the seatbelt device 3 may be disposed so as to extend from a portion near the window of the vehicle 30 closer to the center of the vehicle 30. In this case, the seatbelt device 3 may be installed inside a B pillar (not illustrated) of the vehicle 30. Various other modifications or changes are possible within the scope not departing from the gist of the invention.

The invention claimed is:

1. An occupant protection apparatus, comprising:
a seatbelt device capable of restraining an occupant to be seated on a seat disposed in a vehicle; and
an airbag device that comprises an airbag casing to be disposed on a shoulder region of the occupant,
wherein the seatbelt device comprises a belt extendable through an insertion hole of the airbag casing,
wherein a fastening member is disposed in the insertion hole, the fastening member being configured to fasten the belt to the airbag casing when the belt is pulled out in a crash of the vehicle,
and the occupant protection apparatus further comprising:
a fastening pin capable of fastening the airbag casing to the seat, wherein the fastening pin is broken when the fastening member fastens the belt to the airbag casing in the crash.

2. The occupant protection apparatus according to claim 1, wherein the belt is configured to be pulled out from an upper portion of a seat back of the seat, the upper portion being located closer to an inner side in a vehicle width direction of the vehicle than an outer side.

3. The occupant protection apparatus according to claim 1, wherein the airbag device comprises an inflator, an airbag and an inflation tube, with the inflation tube directly connecting the air bag and the inflator, which inflator is disposed inside a seat back of the seat.

4. The occupant protection apparatus according to claim 1, wherein the airbag device comprises an inflator which is disposed inside a seat back of the seat.

5. The occupant protection apparatus according to claim 1, wherein the casing is pivotably supported by way of a pivot pole extending above an upper region of a seat back of the seat.

6. The occupant protection apparatus according to claim 1, wherein the airbag casing is movable together with the belt while being fastened by the fastening member to the belt.

7. The occupant protection apparatus according to claim 6, wherein the belt is configured to be pulled out from an upper portion of a seat back of the seat, the upper portion being located closer to an inner side in a vehicle width direction of the vehicle than an outer side.

8. The occupant protection apparatus according to claim 1, wherein the belt comprises a tongue plate at one end of the belt and the tongue plate is configured for insertion into a reception hole in a seatbelt buckle.

9. The occupant protection apparatus according to claim 8, wherein the belt is configured to be pulled out from an upper portion of a seat back of the seat, and the insertion hole of the airbag casing is positioned closer to the upper portion of the seat back of the seat than the seatbelt buckle.

10. The occupant protection apparatus according to claim 9, wherein the airbag device comprises an inflator, an airbag, and an inflation tube, with the inflation tube directly connecting the air bag and the inflator, and the inflator being disposed inside the seat back.

11. An occupant protection apparatus, comprising:
a seatbelt device capable of restraining an occupant to be seated on a seat disposed in a vehicle; and
an airbag device that comprises an airbag casing to be disposed on a shoulder region of the occupant,
wherein the seatbelt device comprises a belt extendable through an insertion hole of the airbag casing,
wherein a fastening member is disposed in the insertion hole, the fastening member being configured to fasten the belt to the airbag casing when the belt is pulled out in a crash of the vehicle,
and the occupant protection apparatus further comprising:
a fastening pin capable of fastening the airbag casing to the seat, wherein the fastening pin is broken when the fastening member fastens the belt to the airbag casing in the crash, and a tube that directly connects the air bag and an inflator is disposed inside a seat back of the seat.

12. The occupant protection apparatus according to claim 11, wherein the belt is configured to be pulled out from an upper portion of a seat back of the seat, the upper portion being located closer to an inner side in a vehicle width direction of the vehicle than an outer side.

13. The occupant protection apparatus according to claim 11, wherein the airbag casing is movable together with the belt while being fastened by the fastening member to the belt.

14. The occupant protection apparatus according to claim 13, wherein the belt is configured to be pulled out from an upper portion of a seat back of the seat, the upper portion being located closer to an inner side in a vehicle width direction of the vehicle than an outer side.

15. An occupant protection apparatus, comprising:
a seatbelt device capable of restraining an occupant to be seated on a seat disposed in a vehicle; and
an airbag device that comprises an airbag casing to be disposed on a shoulder region of the occupant,
wherein the seatbelt device comprises a belt extendable through an insertion hole of the airbag casing,
wherein a fastening member is disposed in the insertion hole, the fastening member being configured to fasten the belt to the airbag casing when the belt is pulled out in a crash of the vehicle, and
wherein the casing is pivotably supported by way of a pivot pole extending above an upper region of a seat back of the seat.

* * * * *